(12) United States Patent
Williams

(10) Patent No.: US 10,803,771 B2
(45) Date of Patent: Oct. 13, 2020

(54) FIELD DRESS INSTRUCTION

(71) Applicant: Jordan L. B. Williams, Dallas, TX (US)

(72) Inventor: Jordan L. B. Williams, Dallas, TX (US)

(*) Notice: Subject to any disclaimer, the term of this patent is extended or adjusted under 35 U.S.C. 154(b) by 0 days.

(21) Appl. No.: 16/368,309

(22) Filed: Mar. 28, 2019

(65) Prior Publication Data

US 2019/0304339 A1 Oct. 3, 2019

Related U.S. Application Data

(60) Provisional application No. 62/649,458, filed on Mar. 28, 2018.

(51) Int. Cl.
| | | |
|---|---|---|
| G09B 19/00 | (2006.01) | |
| G09B 19/24 | (2006.01) | |
| A22B 5/00 | (2006.01) | |

(52) U.S. Cl.
CPC ............ *G09B 19/24* (2013.01); *A22B 5/0029* (2013.01); *A22B 5/0094* (2013.01)

(58) Field of Classification Search
CPC ........ A01K 1/00; A01K 1/0245; G09B 19/00; G09B 19/24
USPC .......................................................... 452/149
See application file for complete search history.

(56) References Cited

U.S. PATENT DOCUMENTS

| | | | | |
|---|---|---|---|---|
| 4,628,569 A | * | 12/1986 | Gagliardi, Jr. ........ | A22B 5/0029 452/135 |
| 5,464,368 A | * | 11/1995 | White .................. | A22B 5/0029 426/518 |
| 5,855,507 A | * | 1/1999 | Fisher .................. | A22B 5/0029 452/149 |
| 7,690,972 B2 | * | 4/2010 | Sbarro ................. | A22C 17/004 452/149 |

* cited by examiner

*Primary Examiner* — Richard T Price, Jr.
(74) *Attorney, Agent, or Firm* — Wilson Daniel Swayze, Jr.

(57) ABSTRACT

An instruction kit for field dressing is disclosed. The instruction kit relates to a field dressing model, to be used for learning field dressing of any animal. The instruction kit consists of a life size animal model with furs as epidermis and the body of the animal is wrapped with Velcro® and magnets to provide a real feel of cutting the animal and the pressure to be applied. The kit is provided with a plastic molded knife for serving as a knife to cut the animal model. The anus and genital are attached with the body with magnets and removed using the knife. The field dressing of the animal is required to remove the internal sacks and organs to get untainted meat. The instruction kit is reusable. The instruction kit contains good quality and durable materials to avoid wear and tear in frequent practicing.

19 Claims, 5 Drawing Sheets

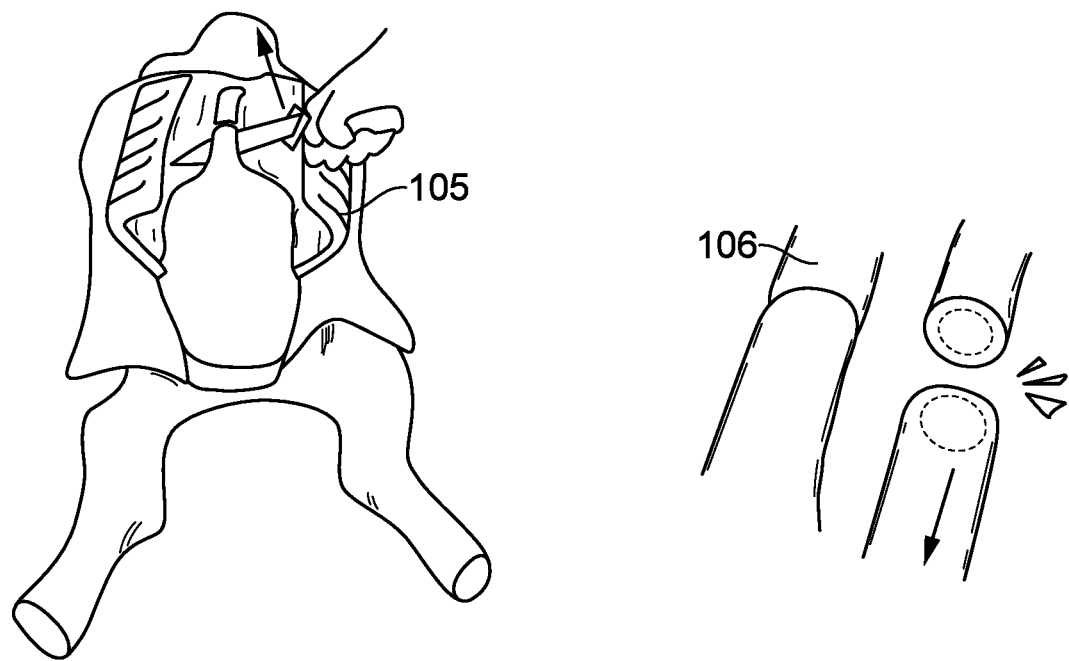
FIG. 2E
FIG. 2F
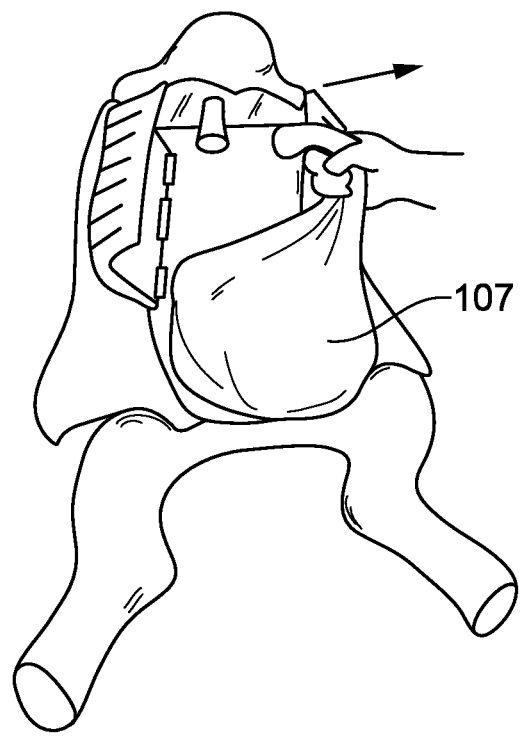
FIG. 2G

FIELD DRESS INSTRUCTION

BACKGROUND OF THE INVENTION

A. Technical Field

The present invention generally relates to an instruction kit for teaching field dressing. More specifically, the present invention relates to an instruction kit to be used for upskilling beginners in field dressing of animal.

B. Description of Related Art

Hunting deer or any animal is pursued by many people as either a sport activity or as survival to have meat. The challenge of hunting deer or any animal should be studied and practiced to proficient at the activity. One style of modern hunting is tracking and pursuing deer, that takes skill and patience. Another type of deer hunting is hunting from blinds and deer stands where the deer are encouraged by feeding or other means to approach the waiting hunter. Regardless of the methods used, once killed the issue of preparing the carcass becomes the primary focus of the deer hunter to preserve the deer for further processing.

The deer should be dressed out quickly to provide the optimum amount of untainted meat for the hunter, once harvested. The process of field dressing is taught by a skilled hunter to an apprentice hunter, taken on a hunt. If the hunter does not have a mentor, they often do not have any idea about the process and optimum methods. The deer should be dressed out as soon as possible after it is harvested. The primary reason is to make sure the meat cools quickly. The organs inside the cavity all generate heat. By removing those organs, the heat is removed from the body of the deer and let the ambient air flow into the cavity to cool the rest of the meat. Field dressing is also used to get rid of much of the remaining blood in the deer. Field dressing also removes bacteria from inside the body cavity. The digestive tract contains bacteria to break down the deer's food. If any of these organs are penetrated with a bullet or arrow, the bacteria will soon contaminate the meat. Removal of the intestines will lighten the load by 25%. This makes carrying or dragging the carcass out of the woods much easier.

Further, field dressing of a deer is a necessary task for any deer hunter. The process of breaking down a deer carcass is an intimidating and frustrating experience for people without experience or proper instruction. Incorrect field dressing on a recently killed deer results in the total loss of the venison. So, getting the proper instruction on how to field dress a deer is vital to a successful hunt. Instructions on hunting should include a course on field dressing. The best way to learn is hand-on experience but that is often difficult in a learning environment such as videos or an instructor pointing to photos or drawings. Getting actual experience on the field dressing of the deer is always best but not always possible.

Therefore, there is a need for an instruction kit for mocking the field dressing of the deer or any animal with a real feel. Further, there is also a need for the apparatus to re-assemble the equipment of the kit for reuse.

SUMMARY OF THE INVENTION

The present invention generally relates to an instruction kit for teaching field dressing. More specifically, the present invention relates to an instruction kit to be used for upskilling beginners in field dressing.

In an embodiment, an instruction kit consists of a life-size artificial carcass of an animal model to show how to field dress the animal model with a hands-on level of understanding. In one embodiment, the animal could be any animal, but not limited to deer. The instruction kit consists of a gel-filled fur epidermis to mimic the feel of the actual animal. Foam and rubber are used under the epidermis to represent the muscles of the deer. The interior of the animal model in the instruction kit contains a structural rib cage that comes with resistant hinges that simulate the difficulty while opening of a rib cage in real time.

In an embodiment, interior organs of the animal model in the instruction kit are represented by a lined sack filled with the simulated deer organs. The instruction kit features a removable anus constructed with a magnetic resistance system to simulate the cutting out of the anus. The cutting is performed with a plastic knife in place of the real field knife. The magnetic connections are also positioned on a simulated windpipe located in the forward section of the animal model in the instruction kit. The magnetic connections offer resistance when practicing cutting out the anus and severing windpipe with the plastic field knife. A line on the windpipe indicates where to cut the windpipe.

In an embodiment, the animal model in the instruction kit is hinged so when the body of the animal model is laid upon the ground on its back, the legs open almost parallel with the ground allowing access to the anus, genitalia, and breastbone. The legs are popped out to the side with the help of one metal hinge inside the leg region of the model. A male genital is attached to the model to teach how to dismember the part. In the case of a female, it is not needed. A knife is used to remove the genital of the animal model on the initial stage of the field dressing.

In an embodiment, the instruction kit helps to learn how to tear apart the animal model to open the rib cage. The muscle exposing the ribcage is cut without cutting the intestinal sack, present below the ribs. A high amount of force is applied on the rib cage to open against the resistance established with the Hook and Loop fasteners, and the magnets placed. After rib cage is opened, the intestinal sack and the windpipe is cut at the marked location, separating the Hook and Loop fastener at the marked location. Then the intestinal sack is removed from the rib cage of the animal model. The intestinal sack is lifted out carefully of the animal model while controlling both the upper and lower tubes. Then any simulated spillage that could taint the meat is eliminated and set aside.

A method for field dressing of an animal model by a user using an instruction kit is also disclosed. The method comprises the steps: a) cutting an artificial removable anus on marked locations and removing from an artificial pelvic of the artificial carcass using a plastic knife; b) cutting an artificial intestine and a gel-filled layer from the artificial removable anus on marked locations using the plastic knife and pulling and opening the gel-filled layer; c) opening an artificial ribcage and cutting an artificial windpipe on the marked sections at a forward section of the artificial carcass, and d) removing an artificial intestinal sack from the artificial carcass.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 2E illustrates the instruction kit helps to learn how to remove the artificial intestinal sack from the artificial ribcage, incorporating the aspects of the present invention.

FIG. 2F illustrates the instruction kit helps to learn how to cut the artificial windpipe, incorporating the aspects of the present invention.

FIG. 2G illustrates the instruction kit helps to learn how to remove the artificial intestinal sack of the animal model, incorporating the aspects of the present invention.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
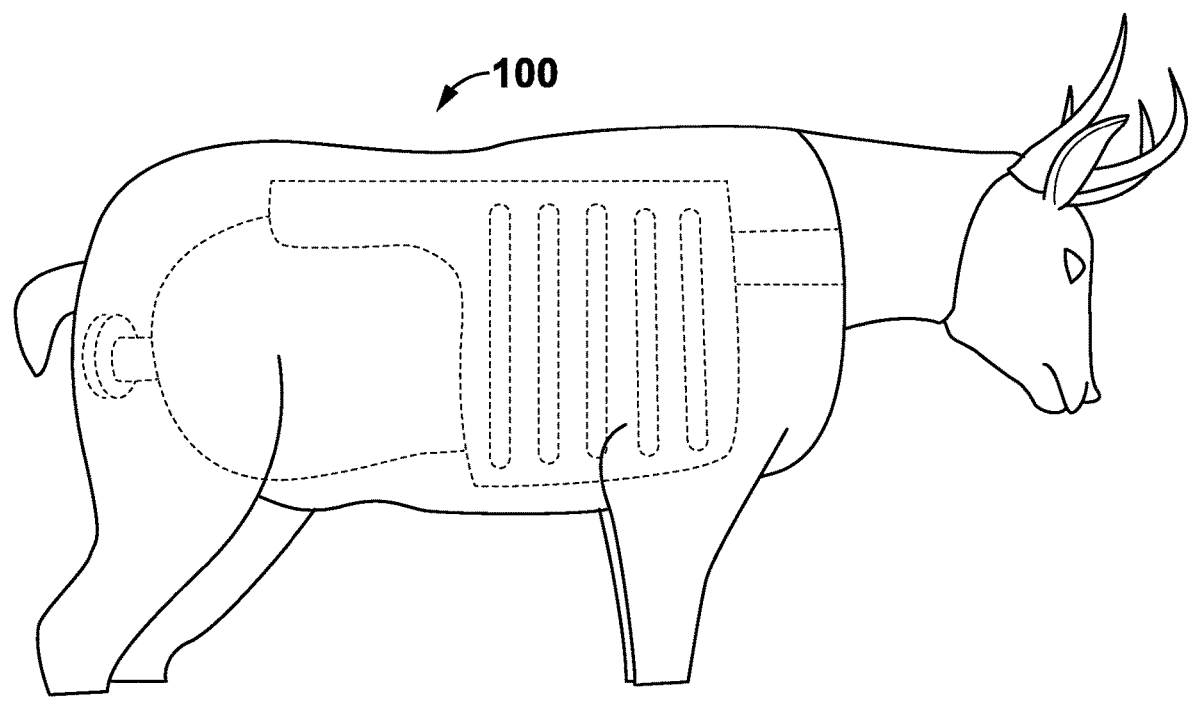
FIG. 1 illustrates an instruction kit for learning field dressing, incorporating the aspects of the present invention.

The present invention relates to an instruction kit 100 for learning field dressing as shown in FIG. 1, incorporating the aspects of the present invention. In one embodiment, the animal could be any animal, but not limited to deer. In an embodiment, the instruction kit 100 consists of a life-size artificial carcass of an animal model to show how to field dress the animal model with a hands-on level of understanding. The instruction kit 100 consists of a gel-filled layer 104 adhesively bonded to a plastic skeleton of the artificial carcass and that mimic the epidermis of the animal carcass for a user while practicing field dressing. In one embodiment, the gel-filled layer 104 of the artificial carcass could be fastened using, but not limited to, hook and look (H&L) fasteners or a Velcro® to provide the mimic feel for the user while cutting and pulling the gel-filled layer 104. Foam and rubber are used under the gel-filled layer 104 to represent the muscles of the deer. The interior of the animal model in the instruction kit 100 contains a structural artificial rib cage 105 that comes with resistant hinges that simulate the difficulty while opening of any rib cage 105 in real time. In another embodiment, interior organs of the animal model in the instruction kit 100 are represented by an artificial lined sack 107 filled with the simulated deer organs. The instruction kit 100 features an artificial removable anus 102 constructed with a magnetic resistance system to simulate the cutting out of the anus 102. The cutting is performed with a plastic knife 103 in place of the real field knife. The magnetic connections are also positioned on a simulated artificial windpipe 106 located in the forward section of the animal model in the instruction kit 100. The magnetic connections offer resistance when practicing cutting out the anus 102 and severing windpipe 106 with the plastic field knife 103. A line on the windpipe 106 indicates where to cut the windpipe 106. In a preferred embodiment, a male genital of the carcass is also represented and could be detached to represent a female gender.

In a preferred embodiment, the instruction kit 100 is an anatomical model with articulated joints. The components are molded around the skeleton and then the skin with fur is adhesively bonded to various sections. Anywhere the molded plastic knife 103 is to cut the attachments made using strategic locations of Hook and Loop fasteners intermixed with small magnets to simulate the effort required to cut as well as to allow the material to separate as required by the process. In a preferred embodiment, the weight of the animal is simulated with the model weighing about 175 pounds with approximately 40 pounds of viscera weight. The skeleton of the animal model is fabricated using polypropylene plastic bones, that are held together with stainless steel wires, operating as hinges. These bones are milky white to simulate typical bone color. The bones allow the silicone rubber muscle to provide the resistance of a real deer. The ribs of the ribcage 105 are molded with a hinge at the upper back and are held together with strong magnets to simulate the force required to open and remove the intestinal sack 107. The muscle is approximated with a silicone rubber foam that is molded around and over the skeleton. It is dyed pink to match normal muscle color and contrasts with the bone to a typical carcass. The horns and any other exterior bones are molded using polypropylene plastic that has been dyed to match typical horn or other exterior bones. The eyes are molded plastic units. They are placed into the molded cavities and adhesively bonded in place.

Figure 2A:
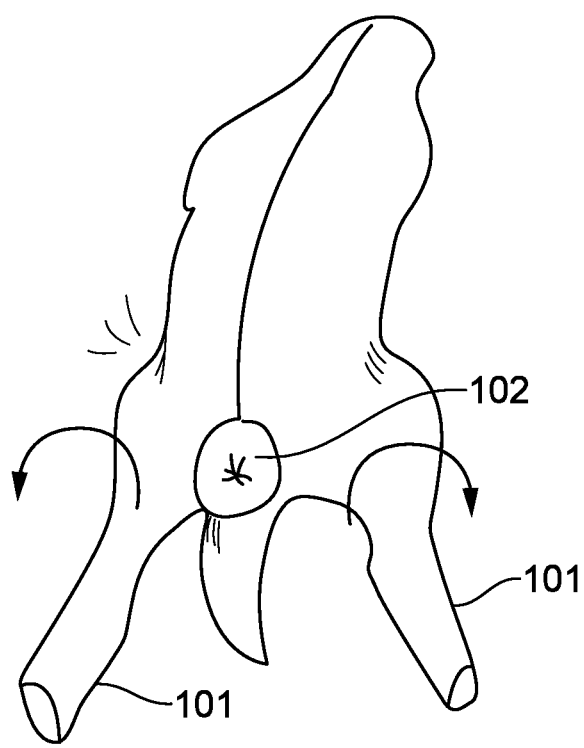
FIG. 2A illustrates a position of the animal model while starting with the field dressing using the instruction kit, incorporating the aspects of the present invention.
Figure 2B:
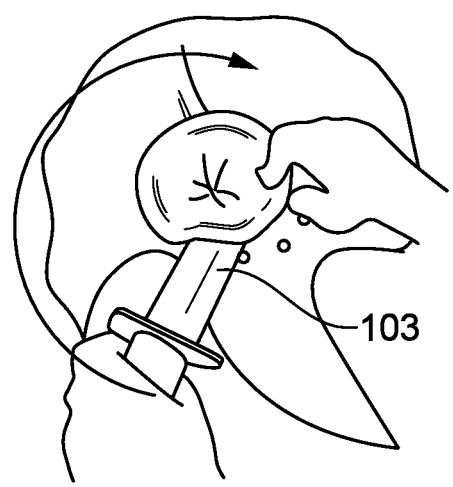
FIG. 2B illustrates a use of a knife to remove the genital of the animal model while starting with the field dressing, incorporating the aspects of the present invention.

FIG. 2A illustrates the position of the animal model while starting with the field dressing using the instruction kit 100, incorporating the aspects of the present invention. In an embodiment, the animal model in the instruction kit 100 is hinged so when the body of the animal model is laid upon the ground on its back, the legs 101 open almost parallel with the ground allowing access to the anus, genitalia, and breastbone. The legs 101 are popped out to the side with the help of one metal hinge inside the leg region of the model. In another embodiment, a male genital is attached to the model to teach how to dismember the part. In the case of a female, it is not needed. A knife 103 is used to remove the genital of the animal model on the initial stage of the field dressing, as shown in FIG. 2B. The artificial anus 102, and genital are cut with the plastic knife 103, by pushing the knife 103 into the animal model.

Figure 2C:
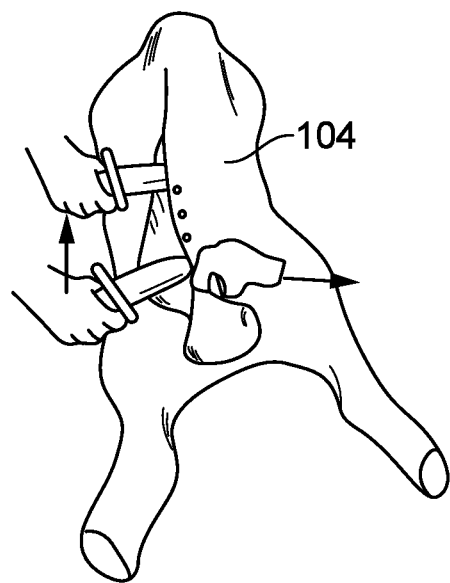
FIG. 2C illustrates the instruction kit helps to learn how to intersect the animal model with the help of the knife, incorporating the aspects of the present invention.

In an embodiment, with the plastic knife 103, a hook fastener is separated from the mating loop fastener within the body of the animal model, providing a real feel of field dressing of any animal. The skin and fur of the animal model are cut from the pelvic incision to the upper end of the breastbone using the plastic knife 103 and the off-hand, as shown in FIG. 2C. The incision separates the magnets holding the gel-filled layer 104 together and exposing the muscle underneath. After the Hook and Loop fastener, and additional magnets for resistance are separated; the anus 102 is removed and the intestine is cut at a marked line for removal from the animal model. In another embodiment, some hunters tie the anal tube off using a length of string to ensure no leakage from the anal tube occurs. In another embodiment, the incision of the body of the animal model is done to cut the gel-filled layer 104 and pull the skin open. In a preferred embodiment, a Velcro® could be used to mimic the resistance of pulling.

Figure 2D:
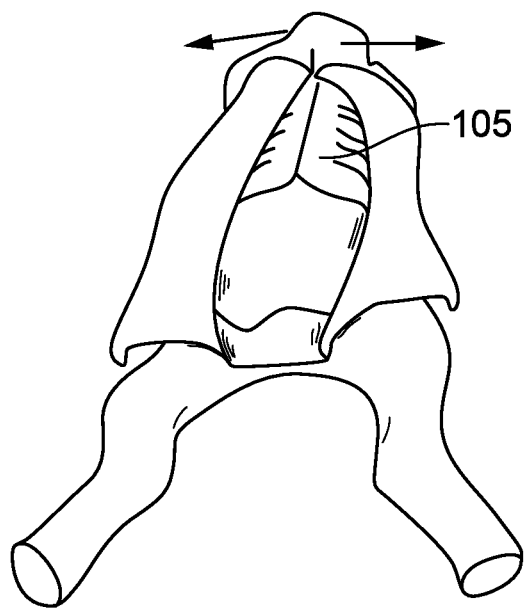
FIG. 2D illustrates the instruction kit helps to learn how to tear apart the animal model to open the artificial rib cage, incorporating the aspects of the present invention.

FIG. 2D illustrates the instruction kit 100 helps to learn how to tear apart the animal model to open the rib cage 105, incorporating the aspects of the present invention. The muscle exposing the ribcage 105 is cut without cutting the intestinal sack 107, present below the ribs. A high amount of force is applied on the rib cage 105 to open against the resistance established with the Hook and Loop fasteners, and the magnets placed. After rib cage 105 is opened, the intestinal sack 107 and the windpipe 106 is cut at the marked location, separating the Hook and Loop fastener at the marked location. Then the intestinal sack 107 is removed from the rib cage 105 of the animal model, as shown in FIG. 2E. It is important to cut the windpipe 106 and esophagus at the correct location and pull down sharply to free the entrails down into the midsection, as shown in FIG. 2F. The intestinal sack 107 is lifted out carefully of the animal model while controlling both the upper and lower tubes. Then any simulated spillage that could taint the meat is eliminated and set aside as shown in FIG. 2G.

Figure 3:
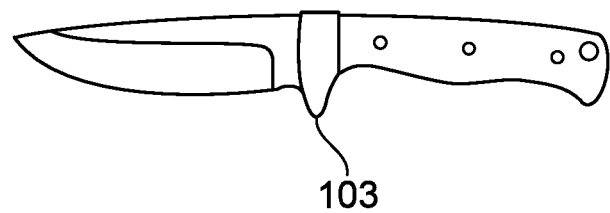
FIG. 3 illustrates a knife used in the instruction kit to dissect the animal model, incorporating the aspects of the present invention.

FIG. 3 illustrates the knife 103 used in the instruction kit 100 to dissect the animal model, incorporating the aspects of the present invention. In an embodiment, the instruction kit 100 comes with a very robust molded plastic knife 103 with a tapered, yet dull edges that will displace the Hook and Loop fasteners and magnets but will not cut the user. With the plastic knife 103, the hook fastener is separated from the mating loop fastener within the body of the animal model, providing a real feel of field dressing the deer.

In a preferred embodiment, the instruction kit 100 brings a close possible experience of field dressing of any animal into the classroom. The instruction kit 100 consists of a life-size artificial carcass of the animal model, which shows how to field dress the animal with a hands-on level of understanding. The instruction kit 100 represents a functional learning experience using a reusable simulated animal carcass for a hands-on learning experience for deer hunters to learn proper field dressing. The instruction kit 100 could be reused. The animal model in the instruction kit simulates internal organs. Male or female genders are represented to create a better understanding about the procedure. The animal model in the instruction kit is simulated with fur and muscles. Removable anus 102 is provided in the kit with magnetic resistance for creating the actual feel of cutting. Windpipe 106 indicates where the animal should be severed. The whole kit is made up of good quality and durable materials.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An instruction kit for teaching field dressing, comprises:
    an artificial carcass of an animal model configured to use for learning field dressing, wherein the artificial carcass comprises:
        a gel-filled layer adhesively bonded to a plastic skeleton of the artificial carcass and that mimic the epidermis of the animal carcass for a user while practicing field dressing;
        an artificial removable anus positioned on a rear section of the artificial carcass and connected to an artificial windpipe via a magnetic resistance system, wherein the removable anus is configured to enable the user to incision from a pelvic of the artificial carcass using a plastic knife;
        an artificial ribcage removably positioned in the artificial carcass and connected via hinges to make resistance for the user to provide mimic feel while opening the ribcage; and
        an artificial intestinal sack removably attached to the artificial windpipe at a forward section of the artificial carcass via the magnetic resistance system, wherein the magnetic resistance system is configured to provide resistance for the user while cutting, thereby learning field dressing of the artificial carcass with a hands-on level of understanding using the instruction kit.

2. The instruction kit of claim 1, wherein the gel-filled layer of the artificial carcass is fastened using hook and look (H&L) fasteners to provide the mimic feel for the user while cutting and pulling the gel-filled layer.

3. The instruction kit of claim 1, wherein the plastic skeleton includes bones that are held together using fasteners.

4. The instruction kit of claim 1, wherein the plastic skeleton is made of polypropylene plastic.

5. The instruction kit of claim 1, wherein the artificial windpipe at the forward section includes marked locations for indicating the user to incision the artificial windpipe.

6. The instruction kit of claim 1, wherein the magnetic resistance system positioned on the windpipe.

7. The instruction kit of claim 1, wherein the magnetic resistance system is configured to provide resistance and mimic feel for the user while cutting the artificial removable anus on the rear section using the plastic knife.

8. The instruction kit of claim 1, wherein the ribcage is molded with hinges and are held together with magnets to simulate the force required to open the ribcage by the user.

9. The instruction kit of claim 1, wherein the artificial intestinal sack of the artificial carcass includes marked locations for indicating the user to incision the artificial intestinal sack and the artificial windpipe at the forward section of the artificial carcass.

10. The instruction kit of claim 1, is made of at least any one of a material includes a foam, a rubber, a silicone rubber, and a combination of foam and rubber.

11. The instruction kit of claim 1, wherein the artificial carcass of an animal model is a deer.

12. A method for field dressing of an animal model by a user using an instruction kit, comprising the steps of:
cutting an artificial removable anus on marked locations and removing from an artificial pelvic of the artificial carcass using a plastic knife;
cutting an artificial intestine and a gel-filled layer from the artificial removable anus on marked locations using the plastic knife and pulling and opening the gel-filled layer;
opening an artificial ribcage and cutting an artificial windpipe on the marked sections at a forward section of the artificial carcass, and
removing an artificial intestinal sack from the artificial carcass.

13. The instruction kit of claim 12, wherein the gel-filled layer is adhesively bonded to a plastic skeleton of the artificial carcass of the animal model, configured to provide a mimic feel for the user while practicing field dressing.

14. The instruction kit of claim 12, wherein the plastic skeleton includes bones that are held together using fasteners and is made of polypropylene plastic.

15. The instruction kit of claim 12, wherein the gel-filled layer of the artificial carcass is fastened using hook and look (H&L) fasteners to provide the mimic feel for the user while cutting and pulling the gel-filled layer.

16. The instruction kit of claim 12, wherein the artificial removable anus positioned on a rear section of the artificial carcass and connected to an artificial windpipe via a magnetic resistance system to provide the mimic feel for the user.

17. The instruction kit of claim 12, wherein the artificial ribcage is molded with hinges and are held together via magnets to simulate the force required to open the artificial ribcage by the user.

18. The instruction kit of claim 12, wherein the artificial intestinal sack of the artificial carcass includes marked locations for indicating the user to incision the artificial intestinal sack and the artificial windpipe using the plastic knife at the forward section of the artificial carcass.

19. The instruction kit of claim 12, is made of at least any one of a material includes a foam, a rubber, a silicone rubber, and a combination of foam and rubber.

* * * * *